(12) United States Patent
Anshel et al.

(10) Patent No.: US 10,505,722 B2
(45) Date of Patent: Dec. 10, 2019

(54) SHARED SECRET COMMUNICATION SYSTEM WITH USE OF CLOAKING ELEMENTS

(71) Applicant: SECURERF CORPORATION, Shelton, CT (US)

(72) Inventors: Iris Anshel, Tenafly, NJ (US); Dorian Goldfeld, Tenafly, NJ (US)

(73) Assignee: SecureRF Corporation, Shelton, CT (US)

( * ) Notice: Subject to any disclaimer, the term of this patent is extended or adjusted under 35 U.S.C. 154(b) by 296 days.

(21) Appl. No.: 15/637,252

(22) Filed: Jun. 29, 2017

(65) Prior Publication Data

US 2018/0013554 A1 Jan. 11, 2018

Related U.S. Application Data

(60) Provisional application No. 62/358,659, filed on Jul. 6, 2016.

(51) Int. Cl.
*H04L 9/08* (2006.01)
*H04L 9/14* (2006.01)
(Continued)

(52) U.S. Cl.
CPC ............ *H04L 9/0822* (2013.01); *H04L 9/006* (2013.01); *H04L 9/008* (2013.01); *H04L 9/08* (2013.01);
(Continued)

(58) Field of Classification Search
CPC . H04L 9/006; H04L 9/008; H04L 9/08; H04L 9/0816; H04L 9/0819;
(Continued)

(56) References Cited

U.S. PATENT DOCUMENTS

| 7,136,484 B1* | 11/2006 | Koh | H04L 9/0662 380/28 |
| 2002/0001382 A1* | 1/2002 | Anshel | H04L 9/0841 380/30 |

(Continued)

OTHER PUBLICATIONS

I. Anshel; M. Anshel; D. Goldfeld; S. Lemieux, Key agreement, the Algebraic Eraser, and Lightweight Cryptography, Algebraic methods in cryptography, Contemp. Math., vol. 418, Amer. Math. Soc., Providence, RI, 2006. (Year: 2006).*

*Primary Examiner* — Jeremy S Duffield
(74) *Attorney, Agent, or Firm* — Moritt Hock & Hamroff LLP; Bret P. Shapiro

(57) ABSTRACT

Systems and methods to produce cloaked keys and shared secret data are described. A first device may select a private key, for the first device, based on a first set of rewritten conjugates. The first device may receive a public key from a second device. The public key may be based on a private key of the second device. The private key of the second device may be based on a second set of rewritten conjugates. The first device may determine first and second cloaking elements based on the public key and the private key of the first device. The first device may produce a cloaked key based on the first and second cloaking elements, and the private key of the first device. The first device may produce shared secret data based on the private key of the first device and a second cloaked key from the second device.

18 Claims, 4 Drawing Sheets

(51) Int. Cl.
*H04L 9/30* (2006.01)
*H04L 9/00* (2006.01)

(52) U.S. Cl.
CPC ............ *H04L 9/085* (2013.01); *H04L 9/0816* (2013.01); *H04L 9/0819* (2013.01); *H04L 9/0825* (2013.01); *H04L 9/0838* (2013.01); *H04L 9/0841* (2013.01); *H04L 9/0844* (2013.01); *H04L 9/0861* (2013.01); *H04L 9/0894* (2013.01); *H04L 9/14* (2013.01); *H04L 9/30* (2013.01)

(58) Field of Classification Search
CPC ... H04L 9/0822; H04L 9/0825; H04L 9/0838; H04L 9/0841; H04L 9/0844; H04L 9/085; H04L 9/0861; H04L 9/30
See application file for complete search history.

(56) References Cited

U.S. PATENT DOCUMENTS

| | | | | |
|---|---|---|---|---|
| 2006/0280308 | A1* | 12/2006 | Anshel | H04L 9/0841 380/285 |
| 2011/0307698 | A1* | 12/2011 | Vanstone | H04L 9/0825 713/171 |
| 2013/0208887 | A1* | 8/2013 | Anshel | H04L 9/06 380/255 |
| 2015/0055777 | A1* | 2/2015 | Wang | H04L 9/0852 380/30 |
| 2017/0134158 | A1* | 5/2017 | Pasol | H04L 9/008 |
| 2017/0366519 | A1* | 12/2017 | Rao | H04L 63/0464 |

* cited by examiner

SHARED SECRET COMMUNICATION SYSTEM WITH USE OF CLOAKING ELEMENTS

CROSS-REFERENCE TO RELATED APPLICATIONS

This application claims priority under 35 U.S.C. § 119(e) to U.S. Provisional Application No. 62/358,659, titled SHARED SECRET COMMUNICATION SYSTEM WITH USE OF CLOAKED STABILIZING ELEMENTS, filed on Jul. 6, 2016. The disclosure of the provisional application is hereby incorporated by reference in its entirety.

BACKGROUND OF THE INVENTION

In some examples, a first device and a second device may exchange messages privately without knowledge from a third device. Each device may choose its own secret key whereby both devices may derive a shared secret. The shared secret may be used to encrypt/decrypt messages or authenticate each device. If the third device does not have possession of the secret keys of both the first and second devices, it may be difficult for the third device to obtain the messages exchanged between the first device and the second device.

SUMMARY OF THE INVENTION

In some examples, systems effective to produce a cloaked key are described. A system may include a memory that may be configured to store cloak data. The cloak data may be effective to indicate a first group, a first set of rewritten conjugates associated with a first set of elements included in the first group, and a second set of rewritten conjugates associated with a second set of elements included in the first group. The first set of elements may commute with the second set of elements. The system may further include a private key selector configured to be in communication with the memory. The system may further include a receiver. The system may further include a stabilizing element generator configured to be in communication with the receiver. The system may further include a rewriter configured to be in communication with the stabilizing element generator. The private key selector may be configured to retrieve the cloak data from the memory. The private key selector may be further configured to select a private key for a first device. The private key of the first device may be based on the first set of rewritten conjugates. The private key selector may be further configured to store the private key of the first device in the memory. The receiver may be configured to receive a public key from a second device. The public key may be an element of a second group, and the public key may be associated with a private key of the second device. The private key of the second device may be based on the second set of rewritten conjugates. The receiver may send the public key to the stabilizing element generator. The stabilizing element generator may be configured to determine a first cloaking element based on the public key and based on the private key of the first device. The stabilizing element generator may be further configured to determine a second cloaking element based on the public key and based on the private key of the first device. stabilizing element generator may be further configured to send the first and second cloaking elements to the rewriter. The rewriter may be configured to receive the first and second cloaking elements from the stabilizing element generator. The rewriter may be further configured to produce a cloaked key based on the first cloaking element, the second cloaking element, and the private key of the first device.

In some examples, methods for producing a cloaked key are described. A method may include retrieving, by a private key selector of a first device, cloak data from a memory of the first device. The cloak data may be effective to indicate a first group, a first set of rewritten conjugates associated with a first set of elements included in the first group, and a second set of rewritten conjugates associated with a second set of elements included in the first group. The first set of elements may commute with the second set of elements. The method may further include selecting, by the private key selector of the first device, a private key of the first device. The private key of the first device may be based on the first set of rewritten conjugates. The method may further include receiving, by a receiver of the first device, a public key from a second device. The public key may be an element of a second group, and the public key may be associated with a private key of the second device. The private key of the second device may be based on the second set of rewritten conjugates. The method may further include sending, by the receiver of the first device, the public key to a stabilizing element generator of the first device. The method may further include determining, by the stabilizing element generator of the first device, a first cloaking element based on the public key and based on the private key of the first device. The method may further include determining, by the stabilizing element generator of the first device, a second cloaking element based on the public key and based on the private key of the first device. The method may further include producing, by a rewriter of the first device, a cloaked key based on the first cloaking element, the second cloaking element, and the private key of the first device.

In some examples, systems effective to produce shared secret data are described. A system may include a first device and a second device. The first device may include a first memory, where the first memory may be configured to store data effective to indicate a first subgroup among a first group. The first subgroup may be based on a first set of rewritten conjugates associated with a first set of elements included in the first group. The second device may include a second memory, where the second device is configured to be in communication with the first device through a network. The second memory may be configured to store a second subgroup among the first group. The second subgroup may be based on a second set of rewritten conjugates associated with a second set of elements included in the first group. The first set of elements commutes with the second set of elements. The first device may be configured to select a private key, for the first device, among the first subgroup. The first device may be further configured to store the private key of the first device in the first memory. The second device may be configured to select a private key, for the second device, among the second subgroup. The second device may be further configured to store the private key of the second device in the second memory. The second device may be further configured to generate a public key based on the private key of the second device. The public key may be an element of a second group, and the public key may be associated with the private key of the second device. The second device may be further configured to send the public key to the first device. The first device may be further configured to receive the public key from the second device. The first device may be further configured to determine a first cloaking element based on the public key and based on the private key of the first device. The first device may be further configured to determine a second cloaking element based on the public key and based on the private key of the first device. The first device may be further configured to produce a first cloaked key based on the first cloaking element, the second cloaking element, and the private key of the first device. The first device may be further configured to send the first cloaked key to the second device. The second device may be further configured to determine a third cloaking element based on the first cloaked key and based on the private key of the second device. The second device may be further configured to determine a fourth cloaking element based on the first cloaked key and based on the private key of the second device. The second device may be further configured to produce a second cloaked key based on the third cloaking element, the fourth cloaking element, and the private key of the second device. The second device may be further configured to send the second cloaked key to the first device. The second device may be further configured to produce the shared secret data based on the first cloaked key and based on the private key of the second device. The first device may be further configured to produce the shared secret data based on the second cloaked key and based on the private key of the first device.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
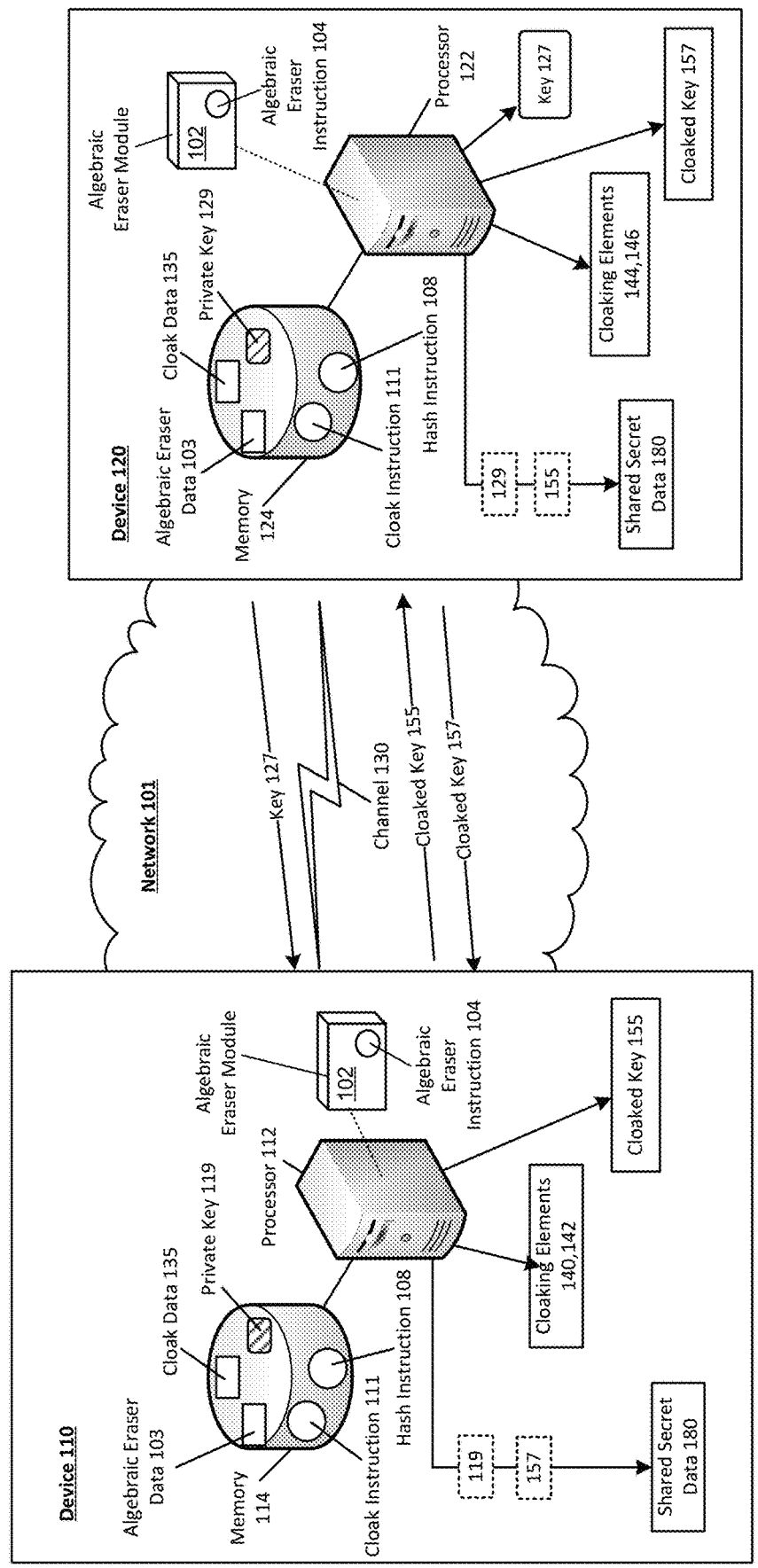
FIG. 1 illustrates an example system drawing of a shared secret communication system.

all arranged according to at least some embodiments described herein.

DETAILED DESCRIPTION OF THE PREFERRED EMBODIMENT(S)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates a system drawing of a shared secret communication system, arranged in accordance with at least some embodiments described herein. System 100 may include at least a device 110 and/or a device 120. In some examples, devices 110, 120 may each be a computing device such as a personal computer, a laptop computer, a mobile device, a cellular phone, a tablet computer, a wearable device, a radio frequency transmitter or receiver, etc. In some examples, device 120 may be a sensor, a radio frequency identification (RF-ID) receiver, etc. Device 110 and device 120 may be configured to be in communication with each other through a network 101. Network 101 may be a wireless network, a wired network, the Internet, a cellular network, a near field communication (NFC) network, a radio frequency identification (RF-ID) network, a cloud computing environment, etc. In some examples, device 110 and device 120 may communicate with each other through a channel 130, where channel 130 may be a public channel, or an open communication channel, within network 101. In some examples, devices 110, 120 may each be controlled by a respective user.

Device 110 may include a processor 112 and/or a memory 114, where processor 112 and memory 114 may be configured to be in communication with each other. Device 110 may further include one or more modules configured to perform operations related to an implementation of system 100. Each module of device 110 may be a piece of hardware component such as a microprocessor, microcontroller, arithmetic logic unit, programmable circuit such as field programmable logic array, system on chip, etc. For example, device 110 may further include an algebraic eraser module 102, where algebraic eraser module 102 may include an algebraic eraser instruction 104. In some examples, processor 112 may control operations of algebraic eraser module 102.

Memory 114 may be configured to store data and one or more instructions. In an example, memory 114 may be configured to store a hash instruction 108, a cloak instruction 111, where cloak instruction 111 may include a rewriting instruction (described below) effective to facilitate production of cloaked keys (described below). In some examples, memory 114 may include one or more layers of memory where each layer may correspond to a respective level of security. For example, memory 114 may include a secured layer, such that data and instructions stored in the secured layer of memory 114 may not be easily accessible to devices different from device 110. Hash instruction 108 and cloak instruction 111 stored in memory 114 may be implemented by hardware components of device 110. For example, device 110 may include hardware components that may execute instructions stored in memory 114, or may include programmable hardware that may be programmed based on instructions stored in memory 114, or may include circuit components that may be combined to implement instructions stored in memory 114. Memory 114 may be configured to store algebraic eraser data 103 (described below), where algebraic eraser data 103 may be data effective to facilitate operations of algebraic eraser module 102 of device 110.

Device 120 may include a processor 122 and/or a memory 124, where processor 122 and memory 124 may be configured to be in communication with each other. Device 120 may further include one or more modules configured to perform operations related to an implementation of system 100. Each module of device 120 may be a piece of a hardware component such as a microprocessor, microcontroller, arithmetic logic unit, programmable circuit such as field programmable logic array, system on chip, etc. For example, device 120 may further include algebraic eraser module 102, where algebraic eraser module 102 may include algebraic eraser instruction 104. In some examples, processor 122 may control operations of algebraic eraser module 102.

Memory 124 may be configured to store data and one or more instructions. In an example, memory 124 may be configured to store hash instruction 108 and cloak instruction 111. In some examples, memory 124 may include one or more layers of memory where each layer may correspond to respective level of security. For example, memory 124 may include a secured layer, such that data and instructions stored in the secured layer of memory 124 may not be easily accessible to devices different from device 120. Hash instruction 108 and cloak instruction 111 stored in memory 124 may be implemented by hardware components of device 110. For example, device 120 may include hardware components that may execute instructions stored in memory 124, or may include programmable hardware that may be programmed based on instructions stored in memory 124, or may include circuit components that may be combined to implement instructions stored in memory 124. Memory 124 may be configured to store algebraic eraser data 103, where algebraic eraser data 103 may be data effective to facilitate operations of algebraic eraser module 102 of device 120.

As will be described in more detail below, device 120 may send a key 127 to device 110 through channel 130. Key 127 may be a public key that may be based on, or may be derived from, a private key 129, where private key 129 may be associated with device 120. In some examples, private key 129 may be ephemeral. Device 110 may determine cloaking elements 140, 142 based on key 127 and a private key 119, where private key 119 may be associated with device 110. In some examples, private key 119 may be ephemeral. In some examples, cloaking elements 140, 142 may each be an element that may disappear upon an application of a one-way function (further described below). Device 110 may apply a cloak instruction 111 on cloaking elements 140, 142, and private key 119 to produce a cloaked key 155. Cloaked key 155 may be effective to cloak private key 119, such that private key 119 may be unobtainable to devices different from device 110. Device 110 may send cloaked key 155 to device 120 through channel 130. Device 120 may determine cloaking elements 144, 146 based on cloaked key 155 and private key 129. In some examples, cloaking elements 144, 146 may each be an element that may disappear upon an application of a one-way function (further described below). Device 120 may apply cloak instruction 111 on cloaking elements 144, 146, and private key 129 to produce a cloaked key 157. Cloaked key 157 may be effective to cloak private key 129, such that private key 129 may be unobtainable to devices different from device 120. Device 120 may send cloaked key 157 to device 110.

As a result of exchanging cloaked keys 155, 157, device 110 and device 120 may each apply algebraic eraser instruction 104 on cloaked keys 157, 155 and private keys 119, 129, respectively, to produce shared secret data 180. For example, algebraic eraser module 102 of device 110 may apply algebraic eraser instruction 104 to a product of private key 119 and cloaked key 157 to produce shared secret data 180. Similarly, algebraic eraser module 102 of device 120 may apply algebraic eraser instruction 104 to a product of private key 129 and cloaked key 155 to produce shared secret data 180. In some examples, hash instruction 108 may include cryptographic hash functions such that an application of hash instruction 108 may lead to a performance of hash functions on shared secret data 180. In some examples, shared secret data 180 may be shared among device 110 and device 120, where shared secret data 180 may be inaccessible to devices different from device 110 and device 120.

Algebraic eraser module 102 of device 110 may be configured to execute algebraic eraser instruction 104, which may be stored in algebraic eraser module 102 and/or memory 114. Algebraic instruction 104 may indicate techniques to use one or more parts of algebraic eraser data 103. Algebraic eraser instruction 104 may include protocols relating to a one-way function that may be computable but difficult, perhaps infeasible, to reverse. In an example, algebraic eraser instruction 104 may include a protocol relating to a one-way function referred herein as E-multiplication, or E-function, that may be defined as:

$$E((N_0, s_0), (M, s)) = (N_0, s_0) \star (M, s) = (N_0 \cdot \Pi(^{s_0}M), s_0 s),$$

where $\star$ denotes the E-function operator, S denotes a group acting on a left side of a monoid $\mathcal{M}$, and N denotes a group that may be a vector space, $\Pi$ denotes a function that may be a monoid homomorphism from $\mathcal{M}$ to N, also denoted as $\Pi: \mathcal{M} \to N$, which may enable a one-way function such as the E-function. The group N may be specified as the group of n×n matrices over a finite field $F_q$, and the function $\Pi: \mathcal{M} \to N$ may be specified by a collection of n invertible elements in $F_q$, termed T-values, such that the function $\Pi$ may evaluate every $M \in \mathcal{M}$ at the specified T-values. The E-function may satisfy the following identity:

$$E((n,s), ((m_1, s_1) \cdot (m_2, s_2))) = E(E((n,s), (m_1, s_1)), (m_2, s_2)).$$

Algebraic eraser data 103 may be public data that may be available to devices that are configured to communicate with other devices through network 101. In an example, algebraic eraser data 103 may include data effective to indicate:

The monoid $\mathcal{M}$ the group N, the group S, the function $\Pi$,

A homomorphism $\varphi: G \to \mathcal{M} \rtimes S$. For $g \in G$, where $\varphi(g) = (M_g, s_g)$, and a projection function, or projection operator, $g \to s_g$ that may be a homomorphism, A braid group $B_n$ for a fixed even integer n, A finite field $F_q$ of q elements, and A set of invertible elements (T-values) in $F_q$.

The monoid $\mathcal{M}$ may be a group of n×n matrices with n-variable Laurent polynomial entries, and the group S may be a group of permutations on n symbols. When S acts on n-variable Laurent polynomials, and further acts on the monoid $\mathcal{M}$, the semi-direct product, $\mathcal{M} \rtimes S$, may be formed.

The E-function may be based on the semi-direct product $\mathcal{M} \rtimes S$, where the semi-direct product may be based on a n-strand braid group $B_n$ with Artin generators, $\{b_1, b_2, \ldots, b_{n-1}\}$, and $B_n$ may be subject to the following identities:

$$b_i b_{i+1} b_i = b_{i+1} b_i b_{i+1}, (i=1, \ldots, n-1),$$

and $$b_i b_j = b_j b_i \ (i, j \text{ with } |i-j| \geq 2).$$

The semi-direct product $\mathcal{M} \rtimes S$, algebraic eraser module 102 may determine a function $\varphi: B_n \to \mathcal{M} \rtimes S$, where each generator $b_i$ may be associated with a permutation $\varphi_i$, which maps $i \to i+1$, $i+1 \to i$, and leaves $$\{1, \ldots, i-1, i+2, \ldots, n\}$$

fixed, and an element $\beta = b_{i_1}^{\epsilon_1} b_{i_2}^{\epsilon_2} \ldots b_{i_k}^{\epsilon_k} \in G$, $(i_j \in \{1, \ldots, n-1\}$, and $\epsilon_{j=\pm} 1)$, is associated with the product of the permutations $\sigma_\beta = \sigma_{i_1} \cdot \sigma_{i_2} \cdot \ldots \cdot \sigma_{i_k}$. Associated to each $b_i$ is an ordered pair of a n×n colored Burau matrix $CB(b_i)$, whose entries are polynomials in the N variables $\{t_1, t_2, \ldots, t_n\}$, together with the permutation $\sigma_i$. These ordered pairs may form the semi-direct product $\mathcal{M} \rtimes S$, and allow for the function $\varphi: B_n \to \mathcal{M} \rtimes S$, to be defined as:

$$\varphi(\beta) = (CB(\beta), \sigma_\beta).$$

When n=4, the matrices $CB(b_1)$, $CB(b_2)$, and $CB(b_3)$ may be defined as follows (the general case is entirely analogous):

$$\begin{pmatrix} -t_1 & 1 & 0 & 0 \\ 0 & 1 & 0 & 0 \\ 0 & 0 & 1 & 0 \\ 0 & 0 & 0 & 1 \end{pmatrix}, \begin{pmatrix} 1 & 0 & 0 & 0 \\ t_2 & -t_2 & 1 & 0 \\ 0 & 0 & 1 & 0 \\ 0 & 0 & 0 & 1 \end{pmatrix}, \begin{pmatrix} 1 & 0 & 0 & 0 \\ 0 & 1 & 0 & 0 \\ 0 & t_3 & -t_3 & 1 \\ 0 & 0 & 0 & 1 \end{pmatrix}.$$

When n=4, with the general case being entirely analogous, $CB(b_1^{-1})$, $CB(b_2^{-1})$, and $CB(b_3^{-1})$ may be given by the following matrices, respectively:

$$\begin{pmatrix} -\frac{1}{t_2} & \frac{1}{t_2} & 0 & 0 \\ 0 & 1 & 0 & 0 \\ 0 & 0 & 1 & 0 \\ 0 & 0 & 0 & 1 \end{pmatrix}, \begin{pmatrix} 1 & 0 & 0 & 0 \\ 1 & -\frac{1}{t_3} & \frac{1}{t_3} & 0 \\ 0 & 0 & 1 & 0 \\ 0 & 0 & 0 & 1 \end{pmatrix}, \begin{pmatrix} 1 & 0 & 0 & 0 \\ 0 & 1 & 0 & 0 \\ 0 & 1 & -\frac{1}{t_4} & \frac{1}{t_4} \\ 0 & 0 & 0 & 1 \end{pmatrix}.$$

Device 110 may apply cloak instruction 111 on private key 119 to produce cloaked key 155. An application of cloak instruction 111 on private key 119 may cloak private key 119, such that it may be difficult, perhaps infeasible, for a device to recover private key 119 from cloaked key 155. Similarly, device 120 may apply cloak instruction 111 on private key 129 to produce cloaked key 157. An application of cloak instruction 111 on private key 129 may cloak private key 129, such that it may be difficult, perhaps infeasible, for a device to recover private key 129 from cloaked key 157. Application of cloak instruction 111 on private keys 119, 129 may be based on cloak data 135, where cloak data 135 may include public information, such as data or information available to devices connected to network 101. In an example, cloak data 135 may include data effective to indicate:

A group G, associated with an obscuring rewriting instruction denoted $\mathcal{R}$, where $\mathcal{R}$ may be the rewriting instruction among cloak instruction 111, A subgroup A that is based on a first set of rewritten conjugates denoted $\{\mathcal{R}(z \, \alpha_1 z^{-1}), \ldots, \mathcal{R}(z \, \alpha_k z^{-1})\}$, where z may be fixed braid element, where $\alpha_i$, i=1, 2, ..., k, is a first set of braid elements among braid group $B_n$, $\mathcal{R}$ denotes an obscuring rewriting instruction among cloak instruction 111, and private key 119 may be selected from the subgroup A, and A subgroup B that is based on a second set of rewritten conjugates denoted $\{\mathcal{R}(z \, \gamma_1 z^{-1}), \ldots, \mathcal{R}(z \, \gamma_l z^{-1})\}$, where $\gamma_j$, i=1, 2, ..., l, is a second set of braid elements braid group $B_n$, every $\alpha_i$ commutes with every $\gamma_j$, and private key 129 may be selected from the subgroup B.

In some examples, when the E-function is braid based, a device may generate subgroup A of braid group $B_n$ based on the first set of rewritten conjugates. Similarly, when the E-function is braid based, a device may generate subgroup B of braid group $B_n$ based on the second set of rewritten conjugates. Subgroups A, B may be commuting subgroups, where A, B≤$B_n$, and subgroups $\varphi(A)$, $\varphi(B)$ of $\mathcal{M} \rtimes S$ may also commute. In some examples, subgroups A, B may be subgroups of the group G included in cloak data 135. In some examples, when system 100 is braid based, group G, included in cloak data 135, may be the braid group $B_n$.

In some examples, an element s∈S may be a second entry of an element of $\varphi(a)$ or $\varphi(b)$. Cloak instruction 111 may further include a stabilizing instruction, where the stabilizing instruction may be executed, such as by devices 110, 120, to generate one or more elements (e.g., cloaking elements 140, 142, 144, 146) that stabilizes an element (1, s)∈$\mathcal{M} \rtimes S$ based on a specified right action. For example, an element (v, id)∈$\mathcal{M} \rtimes S$ may be generated based on the stabilizing instruction, where the element (v, id)∈$\mathcal{M} \rtimes S$ satisfies the property:

$$(1,s) \star (v,id) = (1,s).$$

As shown in the above property, a stabilizing element (v, id) may essentially disappear upon an application of E-function on the stabilizing element and an element (1, s). As will be described in more detail below, device 110 may execute cloak instruction 111 to determine cloaking elements 140, 142 (denoted as v and $v_1$). Similarly, device 120 may execute cloak instruction 111 to determine cloaking elements 144, 146 (denoted as w and $w_1$). Cloaking elements 140, 142, 144, 146 may be used to cloak private keys 119, 129, respectively, such that private keys 119, 129, may be hidden from, and may be unobtainable to, devices different from device 110 and/or device 120.

Figure 2:
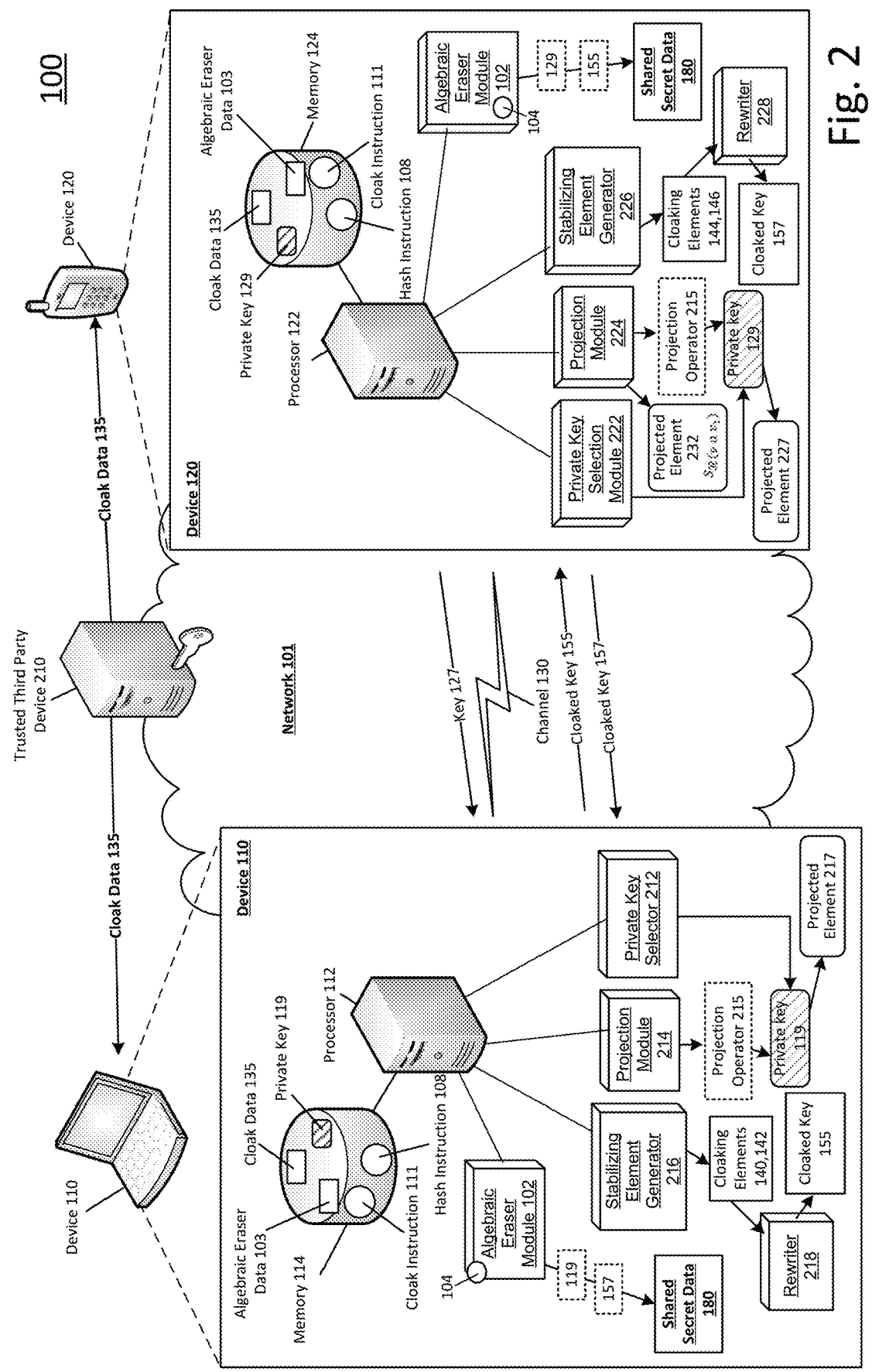
FIG. 2 illustrates the example system drawing of FIG. 1 with additional details relating to an implementation of a shared secret communication system.

FIG. 2 illustrates an example to produce shared secret data by implementation of a shared secret data communication system, arranged in accordance with at least some embodiments described herein. The process in FIG. 2 could be implemented using, for example, system 100 discussed above. Those components in FIG. 2 that are labelled identically to components of FIG. 1 will not be described again for the purposes of clarity.

In the example shown in FIG. 2, devices 110, 120 may be configured to be in communication with a trusted third party device 210. Trusted third party device 210 may be a processor, or a server of a data center, that includes algebraic eraser module 102 configured to execute algebraic eraser instruction 104. Trusted third party device 210 may be configured to be in communication with devices 110, 120, through network 101.

In some examples, trusted third party device 210 may send cloak data 135, including data effective to indicate subgroups A, B, to device 110 and device 120. In some examples, trusted third party device 210 may send cloak data 135 to device 110 or device 120 over an open communication channel of network 101.

Focusing on device 110, in response to receiving cloak data 135, device 110 may select private key 119 from data among cloak data 135. For example, device 110 may further include a private key selector 212, where private key selector 212 may be a hardware module configured to be in communication with processor 112, memory 114, and algebraic eraser module 102. Private key selector 212 may be configured to execute cloak instruction 111 to select private key 119, such as by selecting an element a from subgroup A, where element a may represent private key 119. For example, cloak instruction 111 may indicate a particular number of generators among subgroup A. Private key selector 212 may identify an element (e.g., private key 119) that may be a product of at least the particular number of generators among subgroup A. As a result of identifying an element that may be a product of at least the particular number of generators among subgroup A, a search space of private key 119 may be sufficiently large and cryptographically secured. In some examples, private key 119, selected by device 110, may be ephemeral.

Device 110 may apply a projection operator 215 (denoted as g→$s_g$) on private key 119 (denoted as a) to generate a projected element 217 (denoted as $s_a$). In an example, device 110 may further include a projection module 214, where projection module 214 may be a hardware module configured to be in communication with processor 112, memory 114, algebraic eraser module 102, and private key selector 212. Projection module 214 may be configured to apply projection operator 215 on private key 119 to generate projected element 217, where projected element 217 may be an element of the group S.

Focusing on device 120, in response to receiving cloak data 135, device 120 may select private key 129 from data among cloak data 135. For example, device 120 may further include a private key selector 222, where private key selector 222 may be a hardware module configured to be in communication with processor 122, memory 124, and algebraic eraser module 102. Private key selector 222 may be configured to execute cloak instruction 111 to select private key 129, such as by selecting an element b from subgroup B, where element b may represent private key 129. For example, cloak instruction 111 may indicate a particular number of generators among subgroup B. Private key selector 222 may identify an element (e.g., private key 129) that may be a product of at least the particular number of generators among subgroup B. As a result of identifying an element that may be a product of at least the particular number of generators among subgroup B, a search space of private key 129 may be sufficiently large and cryptographically secure. In some examples, private key 129, selected by device 120, may be ephemeral.

Device 120 may produce key 127 by applying a projection operator 215 (denoted as g→$s_g$) on private key 129 (denoted as b) to generate a projected element 227 (denoted as $s_b$), where projected element 227 may serve as key 127. In an example, device 120 may further include a projection module 224, where projection module 224 may be a hardware module configured to be in communication with processor 122, memory 124, algebraic eraser module 102, and private key selector 222. Projection module 224 may be configured to apply projection operator 215 on private key 129 to generate projected element 227, where projected element 227 may be an element of the group S. In response to the production of key 127, device 120 may send key 127 to device 110 through channel 130.

A receiver of device 110 may receive key 127, and in response, may generate cloaking elements (e.g., cloaking elements 140, 142) based on key 127 ($s_b$). In an example, device 110 may further include a stabilizing element generator 216, where stabilizing element generator 216 may be a hardware module configured to be in communication with processor 112, memory 114, algebraic eraser module 102, private key selector 212, and projection module 214. Stabilizing element generator 216 may be configured to receive key 127 from the receiver of device 110, and, in response, may determine cloaking elements 140, 142 (denoted as v and $v_1$, respectively) based on key 127, and based on projected element 217 generated by projection module 214. In some examples, stabilizing element generator 216 may search for cloaking elements 140, 142 that may satisfy a first set of properties:

$$(1, s_b) \star (M_v, 1) = (1, s_b),$$

$$(1, s_b \cdot s_a) \star (M_{v_1}, 1) = (1, s_b \cdot s_a),$$

where $M_v$ and $M_{v_1}$ each denotes an element among monoid $\mathcal{M}$, and where $M_v$ and $M_{v_1}$ are associated with v and $v_1$, respectively. In some examples, during a determination of cloaking elements 140, 142, stabilizing element generator 216 may request algebraic eraser module 102 to determine whether a particular element (determined by stabilizing element generator 216) satisfies the first set of properties. Algebraic eraser module 102 may send signals to stabilizing element generator 216 to indicate whether the particular element satisfies the first set of properties. In response to a signal indicating that the particular element satisfies the first set of properties, stabilizing element generator 216 may identify the particular element as a cloaking element (e.g., cloaking element 140, or cloaking element 142).

Device 110 may further include a rewriter 218, where rewriter 218 may be a hardware module configured to be in communication with processor 112, memory 114, algebraic eraser module 102, private key selector 212, projection module 214, and stabilizing element generator 216. Rewriter 218 may be configured to apply the obscuring rewriting instruction $\mathcal{R}$ within cloak instruction 111, on cloaking elements 140, 142, and private key 119 to produce cloaking key 155. An application of the obscuring rewriting instruction $\mathcal{R}$ on cloaking elements 140, 142, and private key 119 may be denoted as:

$$\mathcal{R}_{(v a v_1)},$$

where $\mathcal{R}$ (v a $v_1$) may be cloaked key 155. In some examples, cloaked key 155 may be a public key of device 110. In some examples, cloaked key 155 may resemble a random element among monoid $\mathcal{M}$, and it may be infeasible for a device to retrieve private key 119 based on cloaked key 155.

In an example, the E-function may be based on the braid group $B_N$, $\mathcal{M}$ may be a group of colored Burau matrices, and the group S may be the permutation group on N objects. An execution of cloak instruction 111 may be based on braid elements that include an identity element (id) as a second component under the homomorphism φ. Such elements, generally called pure braids, may take a particular form, such as:

$$u b_i^2 u^{-1},$$

where $b_i$ may be one of the braid generators among the braid group $B_N$. Therefore, elements (e.g., cloaking elements 140, 142, 144, 146) produced by the execution of cloak instruction 111 may be a product of braids of this particular form.

In another example, the E-function may be based on the braid group $B_N$, $\mathcal{M}$ may be a group of colored Burau matrices, and the group S may be the permutation group on N objects. An execution of cloak instruction 111 may be based on a selection of two of the T-values, for example, $\tau_a$, $\tau T_b$, equal to the identity element. Given an arbitrary element $(1, s) \in \mathcal{M} \rtimes S$, a cloaking element determined by an execution of cloak instruction 111 may take the particular form $u\, b_i^2\, u^{-1}$, where the permutation associated with the braid element u maps:

$$i \to s^{-1}(a),\ i+1 \to s^{-1}(b).$$

The set of cloaking elements determine by execution of cloak instruction 111 may form a subgroup of $\mathcal{M} \rtimes S$. Hence, an execution of cloak instruction 111 may output a product of various elements (and their inverses) of the particular form (specified above).

Continuing with the example in FIG. 2, device 110 may send cloaked key 155 to device 120 over the channel 130. Private key 119 may be cloaked, or hidden, by cloaked key 155, such that it may be difficult, perhaps infeasible, for a device different from device 110 to obtain private key 119.

A receiver of device 120 may receive cloaked key 155. The receiver of device 120 may send cloaked key 155 to a projection module 224 of device 120, where projection module 224 may be a hardware module configured to be in communication with processor 122, memory 124, algebraic eraser module 102, and private key selector 222. Projection module 224 of device 120 may apply projection operator 215 on cloaked key 155 to determine a projected element 232 (denoted as $s_{\mathcal{R}(v\,a\,v_1)}$. Device 120 may determine projected element 217 ($s_a$) based on projected element 232. In an example, device 120 may determine projected element 217 based on projected element 232 being the same as projected element 217.

In response to determining projected element 217, projection module 224 may send projected elements 217, 227, to a stabilizing element generator 226 of device 120. Stabilizing element generator 226 may be a hardware module configured to be in communication with processor 122, memory 124, algebraic eraser module 102, private key selector 222, and projection module 224. Stabilizing element generator 226 may determine cloaking elements 144, 146 (denoted as w and $w_1$, respectively) based on projected elements 217, 227. Cloaking elements 144, 146 may satisfy a second set of properties:

$$(1,s_a) \star (M_w, 1) = (1, s_a),$$

$$(1, s_a \cdot s_b) \star (M_{w_1}, 1) = (1, s_a \cdot s_b),$$

where $M_w$ and $M_{w_1}$ each denotes a matrix that may be an element of the monoid $\mathcal{M}$. In some examples, during a determination of cloaking elements 144, 146, stabilizing element generator 226 may request algebraic eraser module 102 to determine whether a particular element (determined by stabilizing element generator 226) satisfies the second set of properties. Algebraic eraser module 102 may send signals to stabilizing element generator 226 to indicate whether the particular element satisfies the second set of properties. In response to a signal indicating that the particular element satisfies the second set of properties, stabilizing element generator 226 may identify the particular element as a cloaking element (e.g., cloaking element 144, or cloaking element 146).

Device 120 may further include a rewriter 228, where rewriter 228 may be a hardware module configured to be in communication with processor 122, memory 124, algebraic eraser module 102, private key selector 222, projection module 224, and stabilizing element generator 226. Rewriter 228 may be configured to apply the obscuring rewriting instruction $\mathcal{R}$ within cloak instruction 111, on cloaking elements 144, 146, and private key 129 to produce cloaked key 157. An application of the obscuring rewriting instruction $\mathcal{R}$ on cloaking elements 144, 146, and private key 129 may be denoted as:

$$\mathcal{R}_{(wbw_1)},$$

where $\mathcal{R}$(w a $w_1$) may be cloaked key 157. In some examples, cloaked key 157 may be a public key of device 120. Device 120 may send cloaked key 157 to device 110 over the channel 130. Private key 129 may be cloaked, or hidden, by cloaked key 157, such that it may be difficult, perhaps infeasible, for a device different from device 120 to obtain private key 129. In some examples, cloaked key 157 may resemble a random element among monoid $\mathcal{M}$, and it may be infeasible for a device to retrieve private key 129 based on cloaked key 157.

As a result of exchanging cloaked keys 155, 157, algebraic eraser module 102 of each device 110 and device 120 may execute algebraic eraser instruction 104, including an application of the E-function, to produce shared secret data 180.

In an example, processor 112 of device 110 may identify an element, or matrix, $M_a$ among monoid $\mathcal{M}$, where $M_a$ may be an element associated with private key 119. In the example, the element $M_a$ may be unobtainable by devices different from device 110 due to private key 119 being cloaked in cloaked key 155. Algebraic eraser module 102 of device 110 may apply algebraic eraser instruction 104 (including the E-function) on projected element 217, a matrix associated with private key 119 ($M_a$), a matrix associated with cloaked key 157 ($M_{\mathcal{R}(w\,b\,w_1)}$), and projected element 227 (which serves as key 127, denoted as $s_b$) as shown below:

$$(1,1) \star (M_a, s_a) \star (M_{\mathcal{R}(w\,b\,w_1)}, s_b) = (1,1) \star (M_a, s_a) \star (M_b, s_b),$$

to produce shared secret data 180.

Similarly, processor 122 of device 120 may identify an element, or a matrix, $M_b$ among monoid $\mathcal{M}$, where $M_b$ may be an element associated with private key 129. In the example, the element $M_b$ may be unobtainable by devices different from device 120 due to private key 129 being cloaked in cloaked key 157. Algebraic eraser module 102 of device 120 may apply algebraic eraser instruction 104 (including the E-function) on projected element 217, a matrix associated with private key 129 ($M_b$), a matrix associated with cloaked key 155 ($M_{\mathcal{R}(v\,a\,v_1)}$), and projected element 227 (which serves as key 127, denoted as $s_b$) as shown below:

$$(1,1) \star (M_b, s_b) \star (M_{\mathcal{R}(v\,a\,v_1)}, s_a) = (1,1) \star (M_b, s_b) \star (M_a, s_a)$$

to produce shared secret data 180.

In an example, when the elements in the subgroup A commute with the elements on the subgroup B, the produced shared secret data 180 may take the form:

$$(1,1) \star (M_a, s_a) \star (M_b, s_b) = (1,1) \star (M_b, s_b) \star (M_a, s_a).$$

In some examples, device 110 and device 120 may each execute hash instruction 108 to perform hash functions on shared secret data 180 in order to output shared secrets for further cryptographic applications. In some examples, device 110 and device 120 may each include a hash module, where hash module may be a hardware module, configured to execute hash instruction 108 to perform hash functions on shared secret data 180.

In some examples, cloak data 135 may exclude subgroups A, B, and device 110 (or processor 112 of device 110) may produce subgroups A, B. In response to production of subgroups A, B, device 110 may store subgroup A in a secure layer of memory 114, and may send subgroup B to device 120 over channel 130. Device 120 may store subgroup B in memory 124. Subgroup B may be specified for one or more communication sessions and in a subsequent session. For example, subgroup B may be specified for a number of communication sessions sufficient to produce and exchange cloaked keys 155, 157, such that device 110 and device 120 may remove, or delete, subgroup B from respective memories upon a production of shared secret data 180. In an example, processor 112 of device 110 may determine that a number of communication sessions between device 110 and device 120 exceeds a threshold (which may be indicated by cloak instruction 111) and, in response, may instruct device 120 to remove subgroup B from memory 124. In some examples, device 110 may send an instruction to device 120 in order to instruction device 120 to remove subgroup B from memory 124. When a new shared secret is required, a new subgroup (different from subgroup B) may be generated by device 110, and may be transmitted to device 120 to facilitate production of the new shared secret.

In some examples, cloak data 135 may exclude subgroups A, B, and device 110 (or processor 112 of device 110) may produce subgroups A, B. In response to production of subgroups A, B, device 110 may store subgroup A in a secure layer of memory 114, and may send subgroup B to device 120 over channel 130. Device 120 may store subgroup B in memory 124. Upon selection of private keys 119, 129, from subgroups A, B, device 110 may remove subgroup A from memory 114 and device 120 may remove subgroup B from memory 124.

In some examples, key 127, and cloaked keys 155, 157 may each be a part of a signed certificate, where the signed certificates may be produced by device 110 and/or device 120.

Among other benefits, using a system in accordance with this disclosure a first device and a second device may produce a same secret message based on an exchange of cloaked keys, where the cloaked keys are effective to hide respective private keys from devices outside of the first and second devices. For example, private keys of the first and second devices are not obtainable by a man in the middle. By exchanging cloaked keys, the first and second devices may each produce a shared secret that may be used for enhancing security in further communications and exchange of information. Since the private keys are cloaked in the cloaked keys, it may be impossible for another device to retrieve the private keys even when the cloaked keys are being exchanged in an open communication channel.

Figure 3:
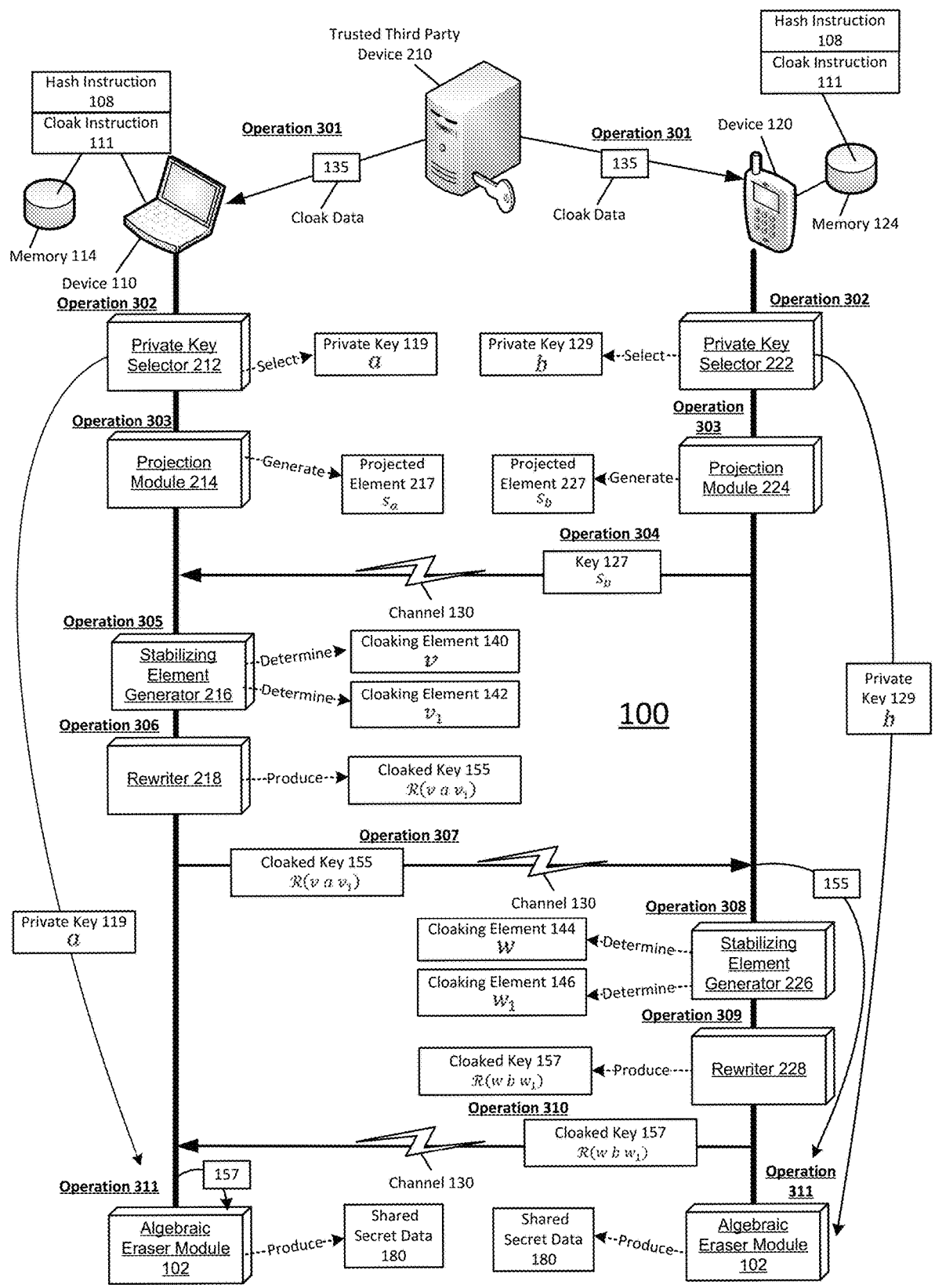
FIG. 3 illustrates the example system drawing of FIG. 1 with additional details relating to an implementation of a shared secret communication system.

FIG. 3 illustrates an example process to implement a shared secret communication system, arranged in accordance with at least some embodiments described herein. The process in FIG. 3 could be implemented using, for example, system 100 discussed above. Those components in FIG. 3 that are labelled identically to components of FIGS. 1-2 will not be described again for the purposes of clarity.

As shown in FIG. 3, an example process to implement system 100 may include operations 301, 302, 303, 304, 305, 306, 307, 308, 309, 310, and 311. The operations to implement system 100 may be performed by one or more components or modules of trusted third party device 210, device 110 and device 120.

The example process may begin at operation 301, where trusted third party device 210 may send cloak data 135 to device 110 and device 120. In some examples, the communication between trusted third party 210 and one of the devices may be over an open channel. In some examples, cloak data 135 may be received by a receiver of device 110, where the receiver of device 110 may receive electromagnetic waves relating to pieces of data, and may convert the received electromagnetic waves into the pieces of data, such as cloak data 135. In some examples, cloak data 135 may be received by a receiver of device 120, where the receiver of device 120 may receive electromagnetic waves relating to pieces of data, and may convert the received electromagnetic waves into the pieces of data, such as cloak data 135. Cloak data 135 may include data effective to indicate, at least, a subgroup A and a subgroup B. In some examples, trusted third party device 210 may send cloak data 135 that includes subgroup A to device 110, and cloak data 135 that includes subgroup B to device 120. In some examples, cloak data 135 may exclude subgroups A, B. In examples where cloak data 135 excludes subgroups A, B, one of device 110 or device 120 may be configured to generate subgroups A, B. Device 110 may store subgroup A in a secure layer of memory 114, and device 120 may store subgroup B in memory 124.

The example process may proceed from operation 301 to operation 302. At operation 302, device 110 and device 120 may each select a respective private key. For example, private key selector 212 of device 110 may select private key 119 (denoted as a) among a subgroup A. Similarly, private key selector 222 of device 120 may select private key 129 (denoted as b) among a subgroup B.

The example process may proceed from operation 302 to operation 303. At operation 303, device 110 and device 120 may each generate a respective projected element. For example, projection module 214 of device 110 may generate projected element 217 (denoted as $s_a$) based on private key 119. Similarly, projection module 224 of device 120 may generate projected element 227 (denoted as $s_b$) based on private key 129, where projected element 227 may serve as key 127 for device 120.

The example process may proceed from operation 303 to operation 304. At operation 304, device 120 may send key 127 to device 110 through a public channel, such as channel 130. In some examples, a transmitter of device 120 may convert data relating to key 127 into electromagnetic waves, and transmit the electromagnetic waves to the receiver of device 110 such that key 127 may be received by the receiver of device 110. The receiver of device 110 may send key 127 (received from device 120) to stabilizing element generator 216 of device 110.

The example process may proceed from operation 304 to operation 305. At operation 305, stabilizing element generator 216 may determine cloaking element 140 (denoted as v) and cloaking element 142 (denoted as $v_1$) based on key 127 and projected element 217. Stabilizing element generator 216 may send cloaking elements 140, 142 to rewriter 218 of device 110.

The example process may proceed from operation 305 to operation 306. At operation 306, rewriter 218 may execute cloak instruction 111 to produce cloaked key 155. For example, rewriter 218 may apply an obscuring rewriting instruction among cloak instruction 111 on cloaking elements 140, 142, and private key 119, to produce cloaked key 155. Rewriter 218 may send cloaked key 155 to a transmitter of device 110.

The example process may proceed from operation 306 to operation 307. At operation 307, device 110, or the transmitter of device 110, may send cloaked key 155 to device 120. A receiver of device 120 may receive cloaked key 155, and may send cloaked key 155 to stabilizing element generator 226 of device 120.

The example process may proceed from operation 307 to operation 308. At operation 308, stabilizing element generator 226 may determine cloaking element 144 (denoted as w) and cloaking element 146 (denoted as $w_1$) based on key 127 (or projected element 227) and projected element 217, where projected element 217 may be obtainable from cloaked key 155. Stabilizing element generator 226 may send cloaking elements 144, 146 to rewriter 228 of device 120.

The example process may proceed from operation 308 to operation 309. At operation 309, rewriter 228 may execute cloak instruction 111 to produce cloaked key 157. For example, rewriter 228 may apply an obscuring rewriting instruction among cloak instruction 111 on cloaking elements 144, 146, and private key 129, to produce cloaked key 157. Rewriter 218 may send cloaked key 157 to a transmitter of device 120, and to algebraic eraser module 102 of device 120.

The example process may proceed from operation 309 to operation 310. At operation 310, device 120, or the transmitter of device 120, may send cloaked key 157 to device 110. A receiver of device 110 may receive cloaked key 157, and may send cloaked key 157 to algebraic eraser module 102 of device 110.

The example process may proceed from operation 310 to operation 311. At operation 311, algebraic eraser module 102 of device 110 may produce shared secret data 180, and algebraic eraser module 102 of device 120 may also produce shared secret data 180. Device 110 may produce shared secret data 180 based on private key 119 and cloaked key 157, and device 120 may produce shared secret data 180 based on private key 129 and cloaked key 155.

Figure 4:
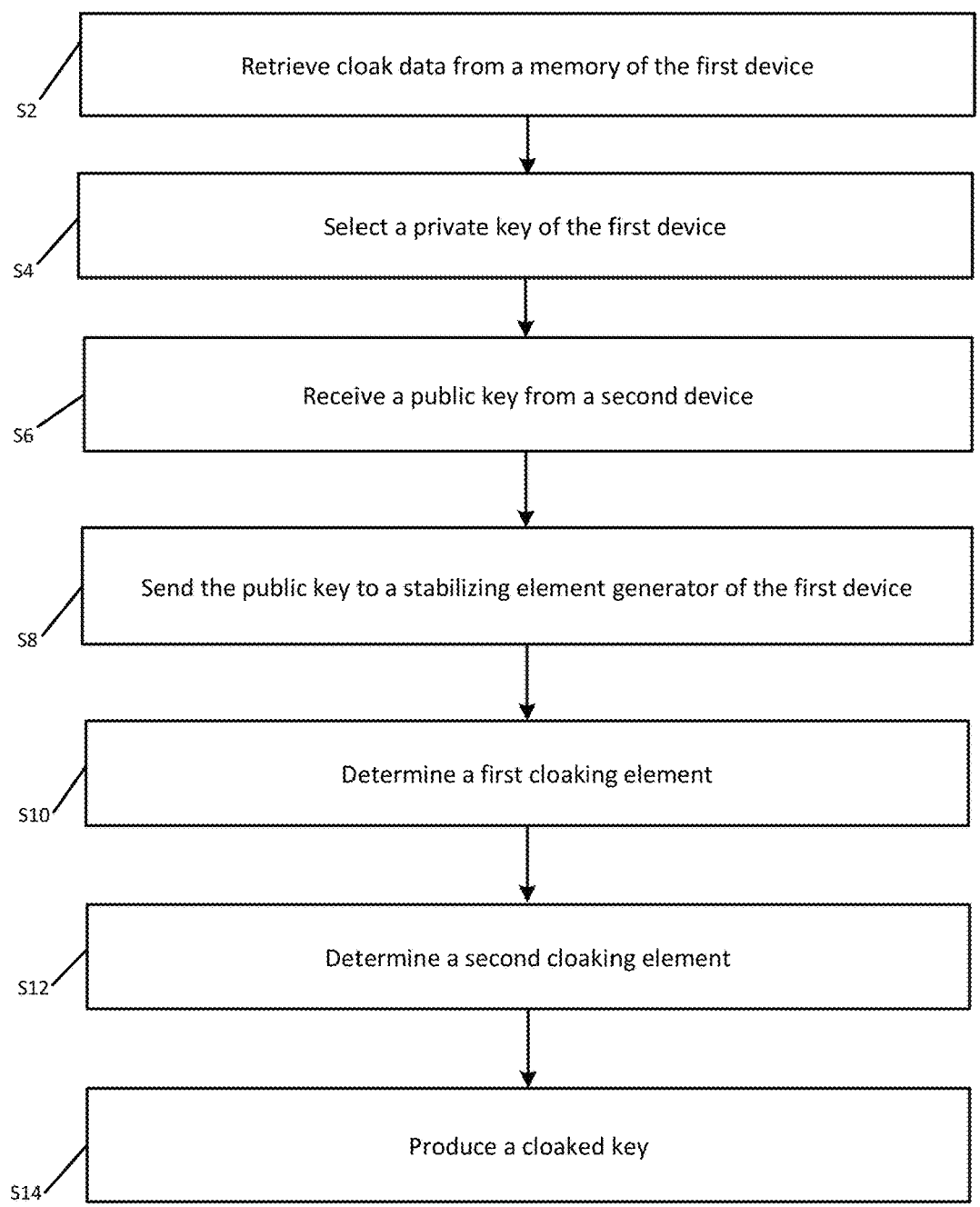
FIG. 4 illustrates a flow diagram for an example process to implement a shared secret communication system.

FIG. 4 illustrates a flow diagram for an example process to implement a shared secret communication system, arranged in accordance with at least some embodiments described herein. The process in FIG. 4 could be implemented using, for example, system 100 discussed above. An example process may include one or more operations, actions, or functions as illustrated by one or more of blocks S2, S4, S6, S8, S10, S12, and/or S14. Although illustrated as discrete blocks, various blocks may be divided into additional blocks, combined into fewer blocks, or eliminated, depending on the desired implementation.

The process may begin at block S2, "Retrieve cloak data from a memory of the first device". At block S2, a private key selector of a first device may retrieve cloak data from a memory of the first device. The cloak data may be effective to indicate a first group, a first set of rewritten conjugates associated with a first set of elements included in the first group, and a second set of rewritten conjugates associated with a second set of elements included in the first group. The first set of elements may commute with the second set of elements.

The process may continue from block S2 to block S4, "Select a private key of the first device". At block S4, the private key selector of the first device may select a private key for the first device. The private key of the first device may be based on the first set of rewritten conjugates. In some examples, the first device may generate a first subgroup based on the first set of rewritten conjugates. The first subgroup may be among the first group, and the private key may be an element among the first subgroup. The first device may further generate a second subgroup based on the second set of rewritten conjugates. The second subgroup may be among the first group. The first device may send the second subgroup to a second device.

The process may continue from block S4 to block S6, "Receive a public key from a second device". At block S6, a receiver of the first device may receive a public key from the second device. The public key may be an element of a second group. The public key may be associated with a private key of the second device. The private key of the second device may be based on the second set of rewritten conjugates. In some examples, the public key is received from the second device through a public channel of a network. The private key of the second device may be an element among the second subgroup.

The process may continue from block S6 to block S8, "Send the public key to a stabilizing element generator of the first device". At block S8, the receiver may send the public key to a stabilizing element generator of the first device.

The process may continue from block S8 to block S10, "Determine a first cloaking element". At block S10, the stabilizing element generator of the first device may determine a first cloaking element based on the public key and the private key of the first device.

The process may continue from block S10 to block S12, "Determine a second cloaking element". At block S12, the stabilizing element generator of the first device may determine a second cloaking element based on the public key and the private key of the first device.

The process may continue from block S12 to block S14, "Produce a cloaked key". At block S14, a rewriter of the first device may produce a cloaked key based on the first cloaking element, the second cloaking element, and the private key of the first device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system effective to produce a cloaked key, the system comprising:
   a memory configured to store cloak data, wherein the cloak data is effective to indicate a first group, a first set of rewritten conjugates associated with a first set of elements included in the first group, and a second set of rewritten conjugates associated with a second set of elements included in the first group, and wherein the first set of elements commutes with the second set of elements;
   a private key selector configured to be in communication with the memory;
   a receiver;
   a stabilizing element generator configured to be in communication with the receiver;
   a rewriter configured to be in communication with the stabilizing element generator;
   a transmitter; and
   an algebraic eraser module;
   the private key selector being configured to:
      retrieve the cloak data from the memory;
      select a private key for a first device, wherein the private key of the first device is based on the first set of rewritten conjugates;
      store the private key of the first device in the memory;
   the receiver being configured to:
      receive a public key from a second device, wherein the public key is an element of a second group, and the public key is associated with a private key of the second device, and the private key of the second device is based on the second set of rewritten conjugates;
      send the public key to the stabilizing element generator;
   the stabilizing element generator being configured to:
      determine a first cloaking element based on the public key and based on the private key of the first device;
      determine a second cloaking element based on the public key and based on the private key of the first device;
      send the first and second cloaking elements to the rewriter;
   the rewriter being configured to:
      receive the first and second cloaking elements from the stabilizing element generator; and
      produce a first cloaked key based on the first cloaking element, the second cloaking element, and the private key of the first device the transmitter being configured to send the first cloaked key to the second device;

the receiver being further configured to receive a second cloaked key from the second device, wherein the second cloaked key is based on a third cloaking element, a fourth cloaking element, and the private key of the second device, and wherein the third and fourth cloaking elements are based on the first cloaked key; and the algebraic eraser module being configured to produce shared secret data based on the second cloaked key and the private key of the first device.

2. The system of claim 1, wherein the public key is received from the second device through a public channel of a network.

3. The system of claim 1 further comprising a projection module configured to be in communication with the private key selector and the stabilizing element generator, wherein:

the private key selector is further configured to, prior to the determination of the first and second cloaking elements, send the private key of the first device to a projection module;

the projection module being configured to:
 apply a projection operator on the private key of the first device to generate a projected element, wherein the projected element is an element of the second group, and the projected element is associated with the private key of the first device; and
 send the first projected element to the stabilizing element generator, wherein determination of the first and second cloaking elements is further based on the projected element.

4. The system of claim 1 further comprising:

a processor configured to be in communication with the memory;

a transmitter configured to be in communication with the memory;

the processor being configured to, prior to selection of the private key of the first device:
 generate a first subgroup based on the first set of rewritten conjugates, wherein the private key of the first device is an element among the first subgroup, and the first subgroup is among the first group;
 generate a second subgroup based on the second set of rewritten conjugates, wherein the private key of the second device is an element among the second subgroup, and the second subgroup is among the first group;
 store the first subgroup in the memory of the first device;
the transmitter being configured to send the second subgroup to the second device.

5. The system of claim 4, wherein the first subgroup is stored in a secure layer of the memory.

6. The system of claim 1, wherein the public key is an output of an application of a projection operator on the private key of the second device.

7. The system of claim 1, wherein the first group is a braid group including two or more generators, the second group is a permutation group, and the public key is a permutation associated with the private key of the second device.

8. A method for producing a cloaked key, the method comprising:

retrieving, by a private key selector of a first device, cloak data from a memory of the first device, wherein the cloak data is effective to indicate a first group, a first set of rewritten conjugates associated with a first set of elements included in the first group, and a second set of rewritten conjugates associated with a second set of elements included in the first group, and wherein the first set of elements commutes with the second set of elements;

selecting, by the private key selector of the first device, a private key of the first device, wherein the private key of the first device is based on the first set of rewritten conjugates;

receiving, by a receiver of the first device, a public key from a second device, wherein the public key is an element of a second group, and the public key is associated with a private key of the second device, and the private key of the second device is based on the second set of rewritten conjugates;

sending, by the receiver of the first device, the public key to a stabilizing element generator of the first device;

determining, by the stabilizing element generator of the first device, a first cloaking element based on the public key and based on the private key of the first device;

determining, by the stabilizing element generator of the first device, a second cloaking element based on the public key and based on the private key of the first device;

producing, by a rewriter of the first device, a first cloaked key based on the first cloaking element, the second cloaking element, and the private key of the first device sending, by a transmitter of the first device, the first cloaked key to the second device;

receiving, by the receiver of the first device, a second cloaked key from the second device, wherein the second cloaked key is based on a third cloaking element, a fourth cloaking element, and the private key of the second device, and wherein the third and fourth cloaking elements are based on the first cloaked key; and producing, by an algebraic eraser module of the first device, shared secret data based on the second cloaked key and the private key of the first device.

9. The method of claim 8, wherein receiving the public key from the second device includes receiving, by the receiver of the first device, the public key through a public channel of a network.

10. The method of claim 8, wherein:

sending the first cloaked key to the second device includes sending, by the transmitter of the first device, the cloaked key to the second device through a public channel of a network; and receiving the second cloaked key include receiving, by the receiver of the first device, the second cloaked key from the second device through the public channel of the network.

11. The method of claim 8, further comprising, prior to determining the first and second cloaking elements:

sending, by the private key selector of the first device, the private key of the first device to a projection module of the first device;

applying, by the projection module of the first device, a projection operator on the private key of the first device to generate a projected element, wherein the projected element is an element of the second group, and the projected element is associated with the private key of the first device; and sending, by the projection module of the first device, the first projected element to the stabilizing element generator of the first device, wherein determination of the first and second cloaking elements is further based on the projected element.

12. The method of claim 8, further comprising, prior to selection of the private key of the first device:
- generating, by the first device, a first subgroup based on the first set of rewritten conjugates, wherein the private key of the first device is an element among the first subgroup, and the first subgroup is among the first group;
- generating, by the first device, a second subgroup based on the second set of rewritten conjugates, wherein the private key of the second device is an element among the second subgroup, and the second subgroup is among the first group;
- storing, by the first device, the first subgroup in the memory of the first device; and
- sending, by a transmitter of the first device, the second subgroup to the second device.

13. The method of claim 12, wherein storing the first subgroup in the memory includes storing the first subgroup in a secure layer of the memory.

14. The method of claim 8, wherein the first group is a braid group including two or more generators.

15. A system effective to produce shared secret data, the system comprising:
- a first device including a first memory, wherein the first memory is configured to store data effective to indicate a first subgroup among a first group, wherein the first subgroup is based on a first set of rewritten conjugates associated with a first set of elements included in the first group;
- a second device including a second memory, wherein the second device is configured to be in communication with the first device through a network, the second memory is configured to store a second subgroup among the first group, wherein the second subgroup is based on a second set of rewritten conjugates associated with a second set of elements included in the first group, and wherein the first set of elements commutes with the second set of elements;
- the first device being configured to:
  - select a private key, for the first device, among the first subgroup;
  - store the private key of the first device in the first memory;
- the second device being configured to:
  - select a private key, for the second device, among the second subgroup;
  - store the private key of the second device in the second memory;
  - generate a public key based on the private key of the second device, wherein the public key is an element of a second group, and the public key is associated with the private key of the second device;
  - send the public key to the first device;
- the first device being further configured to:
  - receive the public key from the second device;
  - determine a first cloaking element based on the public key and based on the private key of the first device;
  - determine a second cloaking element based on the public key and based on the private key of the first device;
  - produce a first cloaked key based on the first cloaking element, the second cloaking element, and the private key of the first device;
  - send the first cloaked key to the second device;
- the second device being further configured to:
  - determine a third cloaking element based on the first cloaked key and based on the private key of the second device;
  - determine a fourth cloaking element based on the first cloaked key and based on the private key of the second device;
  - produce a second cloaked key based on the third cloaking element, the fourth cloaking element, and the private key of the second device;
  - send the second cloaked key to the first device;
  - produce the shared secret data based on the first cloaked key and based on the private key of the second device; and
- the first device being further configured to produce the shared secret data based on the second cloaked key and based on the private key of the first device.

16. The system of claim 15, wherein the first device is further configured to:
- generate the first subgroup and generate the second subgroup prior to selection of the private key of the first device;
- store the first subgroup in the first memory; and
- send the second subgroup to the second device.

17. The system of claim 15, wherein the first subgroup is stored in a secured layer of the first memory.

18. The system of claim 15, wherein:
- the first device is further configured to send the second subgroup and the first cloaked key to the second device through a public channel of the network; and
- the second device is further configured to send the public key and the second cloaked key to the first device through the public channel of the network.

* * * * *